United States Patent
Chun

(10) Patent No.: US 10,362,510 B2
(45) Date of Patent: Jul. 23, 2019

(54) METHOD AND TERMINAL FOR CONTROLLING NETWORK TRAFFIC IN WIRELESS COMMUNICATION SYSTEM

(71) Applicant: LG ELECTRONICS INC., Seoul (KR)

(72) Inventor: Sungduck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/557,346

(22) PCT Filed: Feb. 11, 2016

(86) PCT No.: PCT/KR2016/001388
§ 371 (c)(1),
(2) Date: Sep. 11, 2017

(87) PCT Pub. No.: WO2016/144009
PCT Pub. Date: Sep. 15, 2016

(65) Prior Publication Data
US 2018/0054760 A1 Feb. 22, 2018

Related U.S. Application Data

(60) Provisional application No. 62/131,847, filed on Mar. 12, 2015.

(51) Int. Cl.
*H04W 28/10* (2009.01)
*H04W 28/02* (2009.01)
(Continued)

(52) U.S. Cl.
CPC ............ *H04W 28/10* (2013.01); *H04W 4/00* (2013.01); *H04W 4/50* (2018.02); *H04W 24/02* (2013.01);
(Continued)

(58) Field of Classification Search
CPC . H04W 28/02; H04W 28/10; H04W 28/0278; H04W 24/02; H04W 76/27
See application file for complete search history.

(56) References Cited

U.S. PATENT DOCUMENTS

2014/0010180 A1* 1/2014 Lee ........................ H04W 72/04
370/329
2015/0119015 A1* 4/2015 Gai ........................ H04W 76/18
455/418

(Continued)

FOREIGN PATENT DOCUMENTS

WO 2014/025178 A1 2/2014
WO 2014/042482 A2 3/2014
(Continued)

*Primary Examiner* — Robert C Scheibel
(74) *Attorney, Agent, or Firm* — Dentons US LLP

(57) ABSTRACT

Disclosed are a traffic control method and terminal, the traffic control method comprising the steps of: transmitting, to a base station, a first message including information of an installed application; receiving a second message including information of a barring parameter for the application; determining whether to bar a data transmission on the basis of the barring parameter according to the generation of data from the application, during an operation in a radio resource control (RRC) connection mode; and selectively transmitting the data to the base station according to a determination result.

18 Claims, 7 Drawing Sheets

(51) Int. Cl.
| | |
|---|---|
| *H04W 24/02* | (2009.01) |
| *H04W 76/27* | (2018.01) |
| *H04W 4/00* | (2018.01) |
| *H04W 80/00* | (2009.01) |
| *H04W 4/50* | (2018.01) |
| *H04W 88/02* | (2009.01) |
| *H04W 4/90* | (2018.01) |

(52) U.S. Cl.
CPC ....... *H04W 28/02* (2013.01); *H04W 28/0278* (2013.01); *H04W 76/27* (2018.02); *H04W 80/00* (2013.01); *H04W 4/90* (2018.02); *H04W 88/02* (2013.01)

(56) References Cited

U.S. PATENT DOCUMENTS

| | | | |
|---|---|---|---|
| 2015/0215845 A1* | 7/2015 | Pinheiro | H04W 48/06 455/418 |
| 2015/0230092 A1* | 8/2015 | Ueki | H04W 76/10 455/411 |
| 2015/0257161 A1* | 9/2015 | Hsu | H04L 65/80 455/453 |
| 2016/0374005 A1* | 12/2016 | Cho | H04W 48/06 |

FOREIGN PATENT DOCUMENTS

| | | |
|---|---|---|
| WO | 2014/073866 A1 | 5/2014 |
| WO | 2014/189224 A1 | 11/2014 |
| WO | 2014/209088 A1 | 12/2014 |

\* cited by examiner

METHOD AND TERMINAL FOR CONTROLLING NETWORK TRAFFIC IN WIRELESS COMMUNICATION SYSTEM

This application is a 35 USC § 371 National Stage entry of International Application No. PCT/KR2016/001388 filed on Feb. 11, 2016, and claims priority to U.S. Provisional Application No. 62/131,847 filed on Mar. 12, 2015, all of which are hereby incorporated by reference in their entireties as if fully set forth herein.

TECHNICAL FIELD

The present invention relates to a wireless communication system, and more particularly, to a method of controlling network traffic and user equipment therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Task

One technical task of the present invention is to control a mechanism for controlling network traffic in a mobile communication system such as 3GPP EPS (evolved packet system).

Another technical task of the present invention is to restrict data transmission of a UE in RRC connected mode if necessary.

Further technical task of the present invention is to implement efficient traffic control by adjusting a layer for cutting off a data transmission of a UE.

The technical problems solved by the present invention are not limited to the above technical problems and other technical problems which are not described herein will become apparent to those skilled in the art from the following description.

Technical Solutions

In one technical aspect of the present invention, provided herein is a method of controlling traffic, including transmitting a first message including information of an installed application to a base station, receiving a second message including information of a barring parameter for the application, determining whether to bar a transmission of data based on the barring parameter if the data is generated from the application in the course of operation in RRC (radio resource control) connected mode, and selectively transmitting the data to the base station according to the determined result.

The transmission of the data may be barred at a prescribed one of an application level, an ACDC category level, a PDCP (packet data convergence protocol) entity level, a logical channel level, and an RLC (radio link control) level.

The method may further include performing a BSR (buffer status report). If the transmission of the data is barred, the performing the BSR may exclude a quantity of the barred data in a data quantity calculation process for the BSR.

The first message may include information corresponding to at least one of an ID of the installed application, a name of the installed application, a traffic transmission period of the installed application, an average packet size of the installed application, a protocol used for a data transmission of the installed application, and a presence or non-presence of an emergency relation of the application.

The barring parameter may include at least one of a barring factor for determining a barring rate of the application and a barring time for determining a time interval for barring the application.

The determining whether to bar the transmission may include determining whether to bar the transmission of the data according to a result from performing a probability test based on the barring factor.

The determining whether to bar the transmission may be performed only if an ongoing barring does not exist. If the ongoing barring exists, the data may not be transmitted to the base station.

If the second message indicates to utilize an ACDC parameter in RRC idle mode rather than includes the information of the barring parameter, the determining whether to bar the transmission may be performed based on the ACDC parameter in the RRC idle mode instead of the barring parameter.

The second message may further include information on an ACDC category to which the application pertains.

Each of the first message and the second message may include an RRC message or an NAS (non-access stratum) message.

In another technical aspect of the present invention, provided herein is a user equipment, including a transmitting unit, a receiving unit, and a processor configured to operate by being connected to the transmitting unit and the receiving unit, wherein the processor is further configured to control the transmitting unit to send a first message including information of an installed application to a base station, control the receiving unit to receive a second message including information of a barring parameter for the application, determine whether to bar a transmission of data based on the barring parameter if the data is generated from the application in the course of operation in RRC (radio resource control) connected mode, and control the transmitting unit to selectively transmit the data to the base station according to the determined result.

Advantageous Effects

As is apparent from the above description, the embodiments of the present invention have the following effects.

First of all, by selectively cutting off a data transmission of a UE, network traffic can be improved if necessary.

Secondly, by selectively cutting off a data transmission to a UE operating in RRC connected mode, network traffic can be controlled irrespective of an operating mode of a UE.

Thirdly, by adjusting a layer for barring a data transmission in a UE, efficiency of network traffic improvement can be maximized.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE FOR INVENTION

Figure 1:
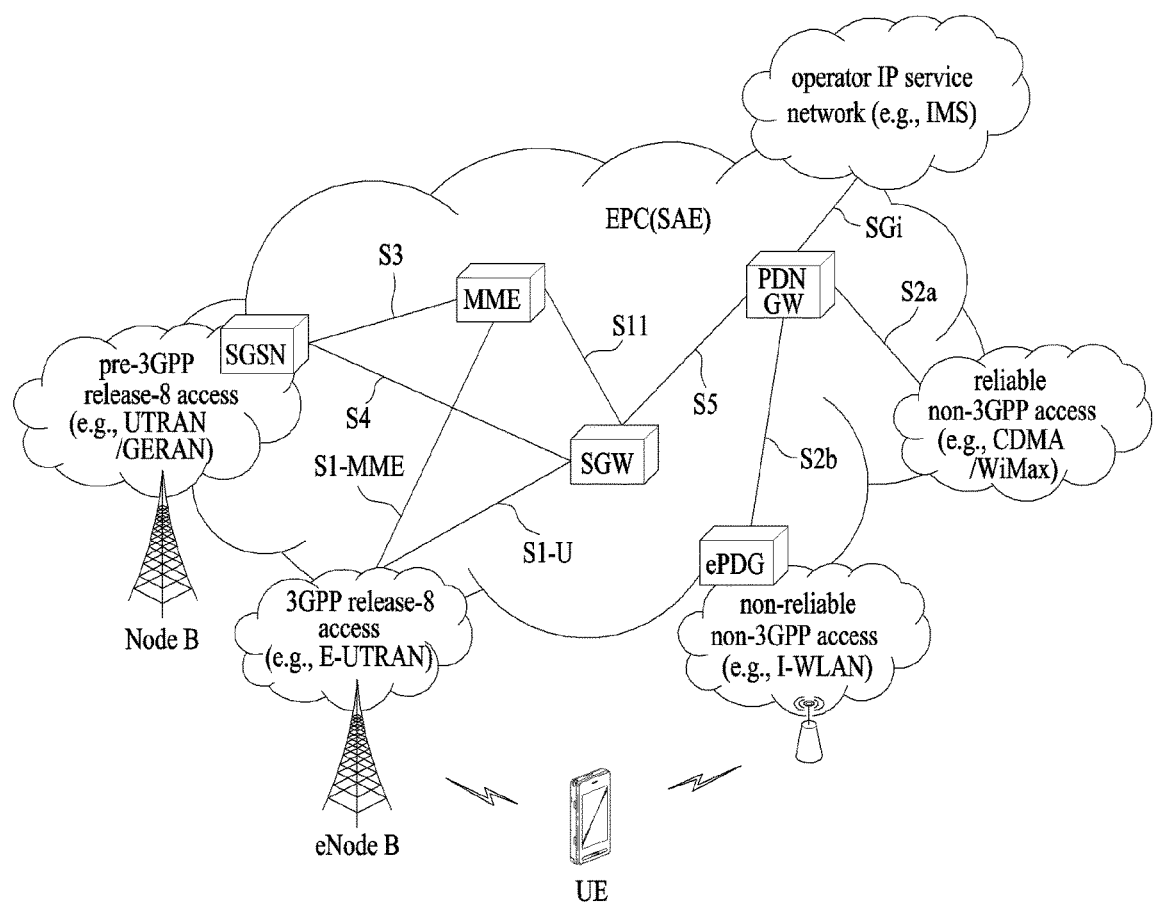
FIG. 1 is a diagram illustrating a brief structure of an evolved packet system (EPS) that includes an evolved packet core (EPC).

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

First of all, the terms used in this specification can be defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-Network Relay without service from E-UTRAN in a UE-to-Network Relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP (SUPL Location Platform): entity that controls Location Service Management and Position Determination. The SLP includes SLC(SUPL Location Center) function and SPC(SUPL Positioning Center) function. Details of the SLP will be understood with reference to Open Mobile Alliance (OMA) standard document OMA AD SUPL: "Secure User Plane Location Architecture".

USD (User Service Description): application/service layer transmits USD, which includes TMGI (Temporary Mobile Group Identity) for each MBMS service, start and end time of session, frequencies, and MBMS service area identities (MBMS SAIs) information belonging to MBMS service area, to the UE. Details of the USD will be understood with reference to 3GPP TS 23.246.

ISR (Idle mode Signaling Reduction): When a UE frequently moves between E-UTRAN and UTRAN/GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060]

Mission Critical Push To Talk: a group communication service that provides a fast establishment time, a capability capable of processing a large scaled group, powerful security, and priority handling.

ANDSF (Access Network Discovery and Selection Function): This is one of network entities for providing a policy for discovering and selecting an access that can be used by a UE on an operator basis.

ISRP (Inter-System Routing Policy): This is a protocol defined by the operator to indicate which one will be used by the UE for routing of IP traffic among several radio access interfaces. The ISRP may include three types of protocols as follows, as a policy for defining an access network preferred (i.e., having a high priority) or restricted to route/steer a packet service (or an IP flow or IP traffic or applications). That is, the ISRP may be divided into an IP flow mobility (IFOM) protocol, a multi access PDN connectivity (MAPCON) protocol, and a non-seamless WLAN offload (NSWO) protocol as follows.

IFOM (IP Flow Mobility) protocol: This protocol is in regards to a list in which access technologies/access networks to be used by the UE are arranged according to a priority, when traffic matched to a specific IP traffic filter can be routed on a specific APN or on a random APN. Further, this protocol may designate for which radio access the traffic matched to the specific IP traffic filter is limited on the specific APN or on the random APN.

MAPCON (Multi Access PDN Connectivity) protocol: This protocol is a list in which the access technologies/access networks to be used by the UE are arranged according to the priority when a PDN connection for the specific APN can be routed. Further, this protocol may designate for which radio access a PDN connection to a specific APN will be limited.

NSWO(Non-seamless WLAN offload) protocol: This protocol designates whether certain traffic will be offloaded or not offloaded non-seamlessly to a WLAN.

ISMP (Inter-System Mobility Policy): This is a set of protocols defined by an operator to have an impact on an inter-system mobility decision made by the UE. When the UE can route IP traffic on a single radio access interface, the UE may use ISMP to select the most appropriate access technology type or access network in a given time.

RAN rule: This is a rule received from the network and is called RAN support information. The RAN rule is also called WLAN interworking supported by the RAN used without ANDSF ISRP/ISMP. When the RAN rule for moving traffic to the WLAN is satisfied, an access stratum (AS) layer of the UE delivers a move-traffic-to-WLAN indication and a WLAN identifier together to a higher layer of the UE. Alternatively, when the RAN rule for moving the traffic to the 3GPP access is satisfied, the AS layer of the UE delivers a move-traffic-from-WLAN indication to the higher layer of the UE. 3GPP. 3GPP TS 23.401, TS 23.060, TS 23.402, TS 36.300, TS 36.304, TS 36.331, TS 25.304, and TS 25.331 may be incorporated herein for detailed descriptions on the RAN rule.

Local Operating Environment Information: This is a set of implementation specific parameters which describe the local environment in which the UE is operating.

Network-Based IP Flow Mobility (NBIFOM): This is IP flow mobility based on network based mobility protocol (GTP or PMIP).

UE-initiated NBIFOM: This is NBIFOM in which the UE initiates IP flow mobility.

Network-initiated NBIFOM: This is NBIFOM in which the network initiates IP flow mobility.

Multi-access PDN connection: This is a PDN connection in which traffic can be routed through the 3GPP access and/or the WLAN access. Each IP flow is routed only through one access at one instance.

Routing filter: This is a set of IP header parameter values/ranges of a packet flow used to identify IP flow for the purpose of routing.

Routing access type: This is a type of an access for routing a set of IP flows of PDN connection (3GPP access or WLAN access.

Routing Rule (RR): This is a set of information that enables association between the routing filter and the routing access type.

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
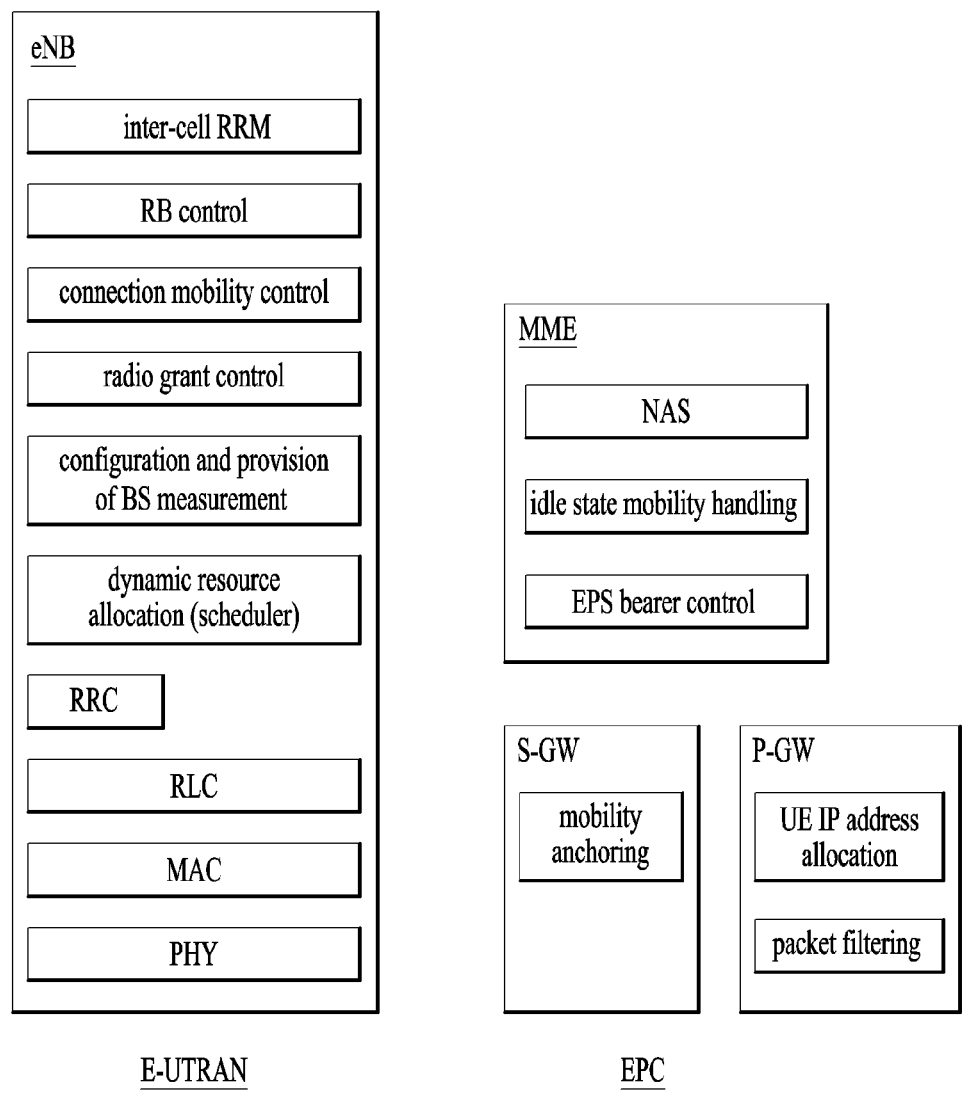
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
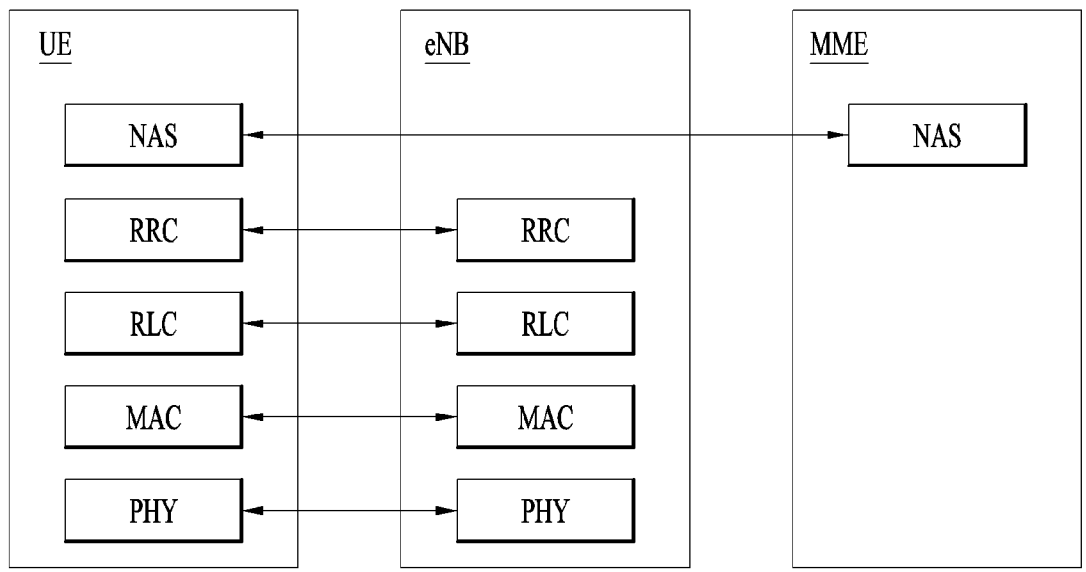
FIG. 3 is an exemplary diagram illustrating a structure of a radio interface protocol on a control plane.
Figure 4:
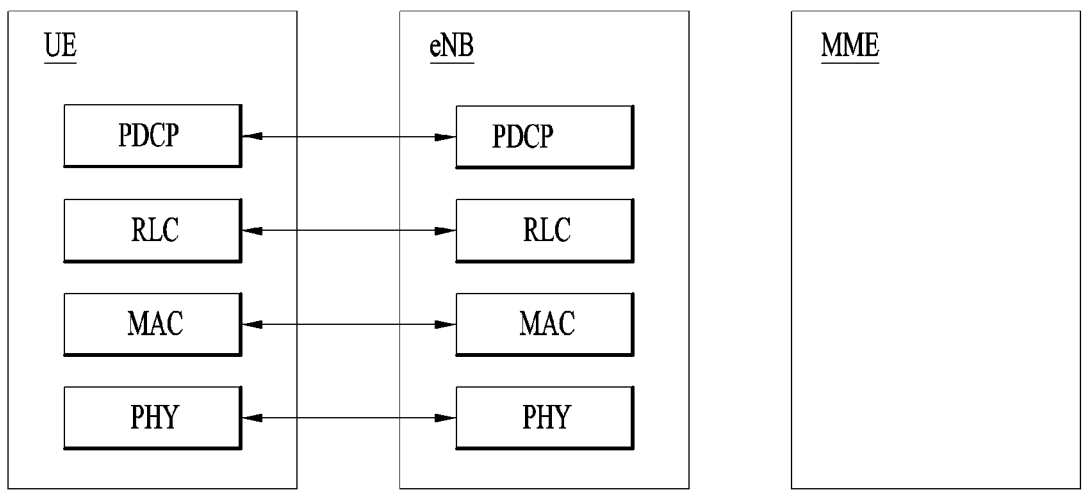
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
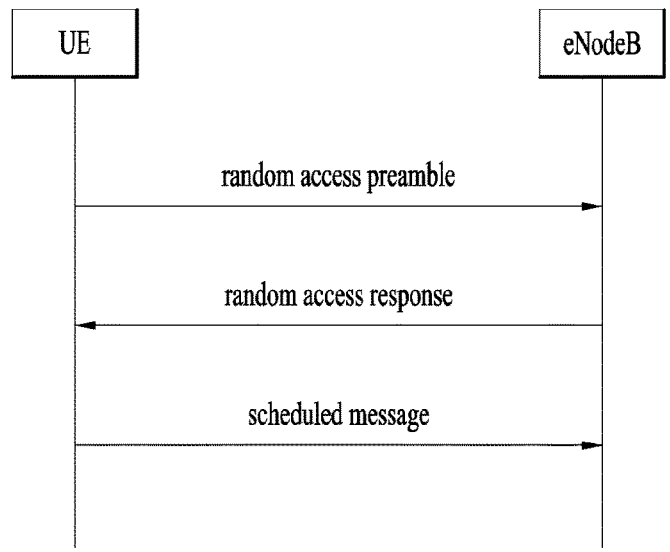
FIG. 5 is a flow chart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
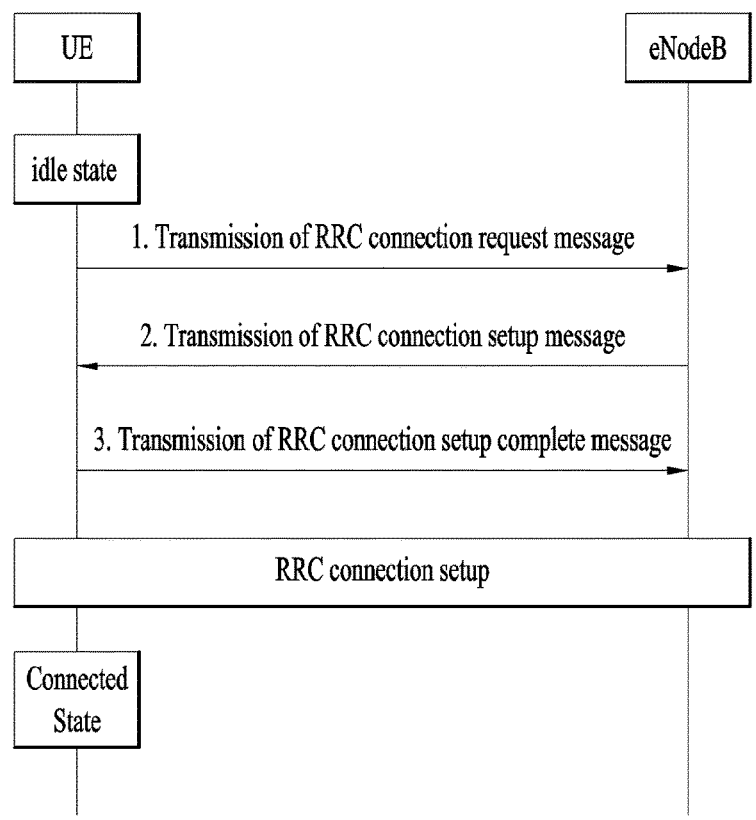
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2. ACDC (Application Specific Congestion Control for Data Communication)

ACDC is an access control mechanism by an operator, and operates to allow or prevent a new access attempt by an application recognized by the operator in a UE. A network can prevent or reduce overload of an access network and/or a core network through ACDC.

The ranking of an ACDC category is determined in order of a probability to be restricted. An operator assigns an application requiring a minimum restriction only to an ACDC category of the highest ranking. Through this, it is able to reduce influence on an access attempt of the corresponding application. If the operator determines to apply ACDC to a roaming UE, the aforementioned ACDC category configuration scheme is applicable to the roaming UE according to the same principle.

Meanwhile, numerous applications failing to be assigned to an ACDC category exist in a UE. The UE handles these applications as corresponding to an ACDC category of the lowest ranking. If an operator needs to discriminate the uncategorized applications, the operator should not assign the corresponding applications to the ACDC category of the lowest ranking.

In the following, requirements related to ACDC are described. ACDC is applied to both UTRAN and E-UTRAN, and should be applied to a UE that is not a member of one or more of access classes 11 to 15. A home network should be able to set at least 4 ACDC categories for a UE, and each of the ACDC categories is related to an application recognized by the operator. The ACDC category is ranked in order of a probability to be restricted. And, an HPLMN operator is responsible for providing an ACDC category to a UE.

A serving network should be able to broadcast information (e.g., barring rate) to each ACDC category in one or more areas of RAN, and should be also able to broadcast whether a roaming UE becomes a target of an ACDC control. A UE can control whether to allow an access attempt of a specific application according to the broadcasted control information and the ACDC category settings in the UE.

The serving network should be able to indicate the ACDC simultaneously with an access control mechanism of another type. For instance, if both of the ACDC and the ACB control mechanism are indicated, the ACDC is applied by being prior to the ACB (access class barring).

In case that a multitude of core networks share the same access network, the access network should be able to apply ACDC to each of the different core networks. In order to reduce complexity in a shared RAN, a barring rate should be set equal for all operators.

The aforementioned ACDC mechanism is applied in case that a UE attempts an establishment of RRC connection. If the UE is already in RRC connected mode, the ACDC mechanism is not applied. Namely, if a UE is in RRC idle mode and has data to transmit, the UE checks whether an application having generated data is barred from establishment of RRC connection. Yet, after the UE has made a transition to an RRC connected mode due to any reason, the UE does not check whether data is barred from a specific application.

A data path does not exist between a UE in RRC idle mode and a network. Hence, if receiving data from an application, a UE can easily determine whether to establish an RRC connection. On the other hand, a data path exists between a UE in RRC connected mode and a network. Hence, a barring mechanism of a type, which uses a control of RRC connection establishment, does not operate.

For instance, assume a case that a download of video in a cell is barred. In case of a UE in idle mode, even if the UE desires to download a video, such an operation is barred. On the other hand, a UE establishes a connection to a network for a voice call and is then able to start a download of a video after making a transition to an RRC connected mode. Such a situation corresponds to a case that a barring is not achieved according to a desired scenario, which may cause a problem.

3. Proposed Traffic Control Method

As mentioned in the foregoing description, ACDC is a mechanism applied to a UE in RRC idle mode. In the following, proposed is a traffic control method applied to a UE in RRC connected mode as well. Namely, according to the proposed traffic control method, as a presence or non-presence of data transmission/reception from a specific application of a UE in RRC connected mode is adjusted, traffic from the UE is controlled. The proposed traffic control method (or an access barring method) can be defined as a name such as an enhanced ACDC, an expanded ACDC, ACDC-C (ACDC-connected mode), ACDC like mechanism and the like, by which the proposed method is non-limited.

Figure 7:
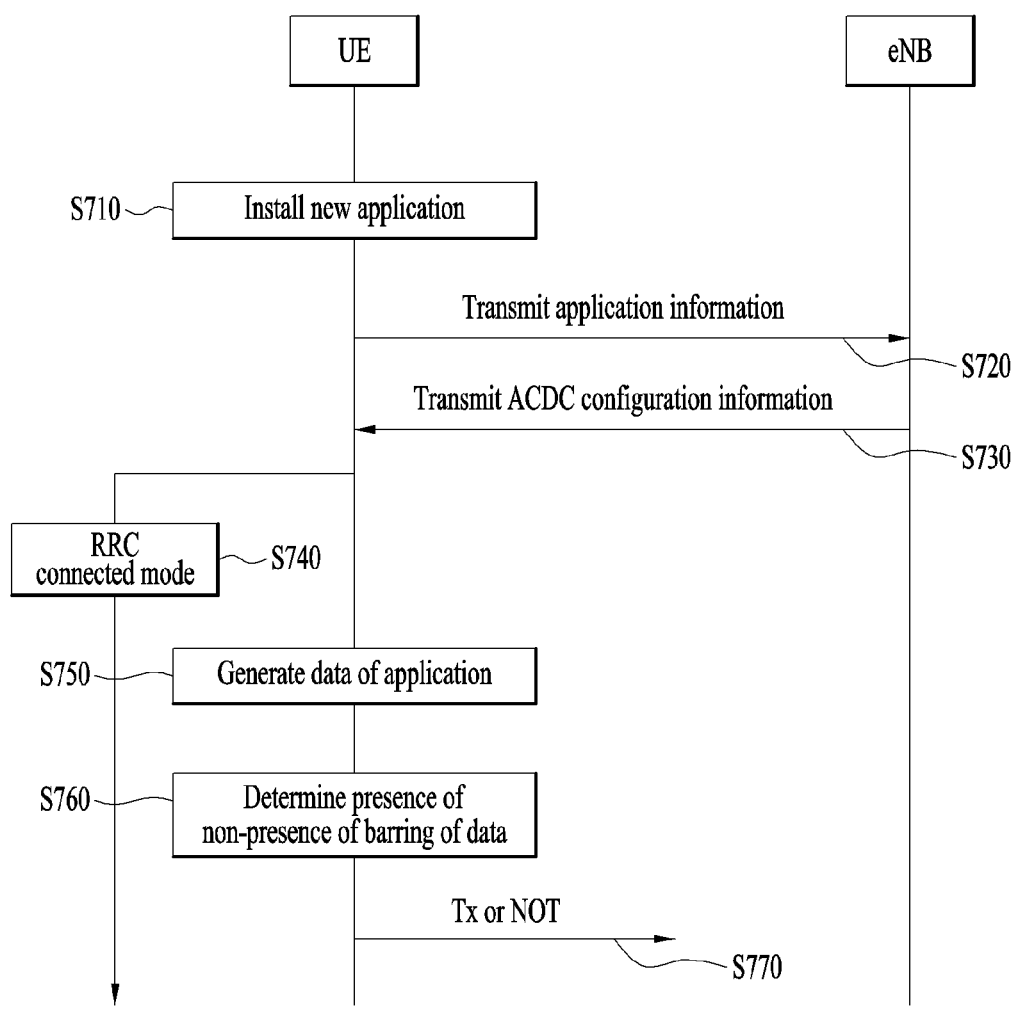
FIG. 7 and FIG. 8 are diagrams to describe a proposed traffic control method.
Figure 8:
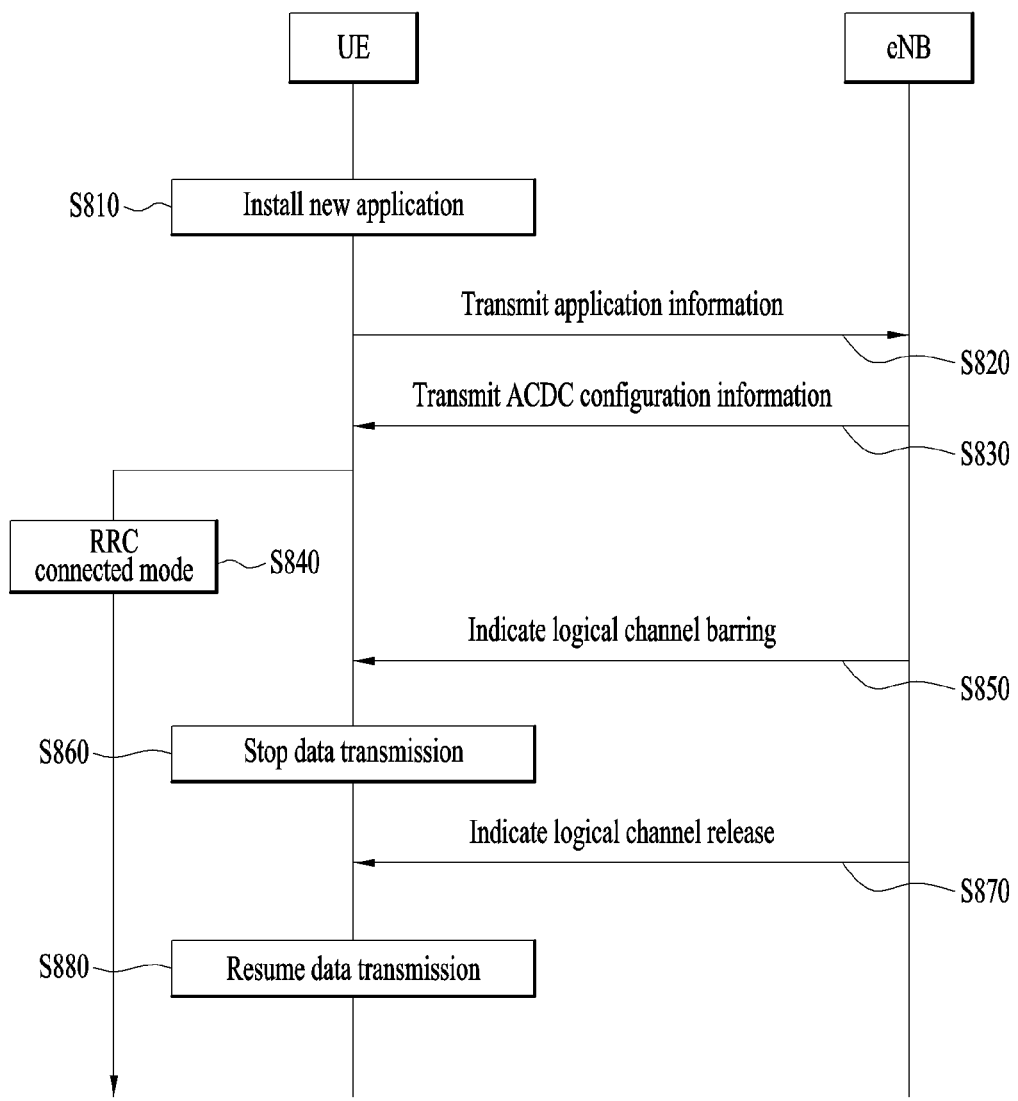

FIG. 7 and FIG. 8 are diagrams to describe a proposed traffic control method. FIG. 7 shows an embodiment of a UE based operation, and FIG. 8 shows an embodiment of a network (or base station) based operation.

First of all, FIG. 7 is described. In order to perform a proposed traffic control method, ACDC related parameters should be transmitted to a UE from a network. The ACDC related parameters may be transmitted to the UE in form of RRC or NAS message and may be transmitted to the UE from a base station or EPC.

The UE and/or network manages a list of applications installed on the UE. In particular, if a new application is installed on the UE (S710), the UE sends information on the new application to an eNB (S720). The information on the application includes an application ID for identifying the application and a name of the application. Here, a target to which the UE sends the information on the application may include a different network node (e.g., MME) instead of the eNB shown in FIG. 7. Namely, although the eNB is shown in FIG. 7 only, the eNB is just one example of the target to which the UE sends information and a different network node such as MME or the like can be the target.

Besides, the information on the application may include information on a traffic pattern from the application. The traffic pattern may mean a period (or, average period) in which traffic is generated and sent in case that an application generates traffic with a relatively uniform period. In case of an application for generating data with a long period, traffic can be controlled despite barring a data transmission less. Yet, in case of an application for generating data with a short period, data transmission should be barred with higher probability. The information on the traffic pattern may include information (or, average size) on a size of a data packet as well as the information on the period for generating and transmitting traffic. Moreover, the information on the traffic pattern may include information (e.g., TCP (transmission control protocol), UDP (user datagram protocol)) on a protocol used by an application for transmission of a traffic packet as well. Namely, the information on the traffic pattern may include various kinds of informations related to whether an application sends a packet having a prescribed size in a prescribed period.

Moreover, the information on the application may also include information indicating whether the installed application is related to an emergency. In case of the application related to the emergency, the transmission should be guaranteed irrespective of the ID of the application, the period of the application or the like.

Having received the information on the application from the UE, the network (eNB) sends the UE the ACDC configuration information on the application installed on the UE in response (S730). The ACDC configuration information may include information on an ACDC category to which the application pertains and a barring parameter for the application. Namely, based on the information on the application received from the UE, the network (eNB) determines that the corresponding application pertains to a specific one of a plurality of ACDC categories. The barring parameter may include information indicating a barring factor, which is a value used to determine a barring rate of the application, and information indicating a barring time that is a value used to determine a time interval for barring data transmission of the application. Since each ACDC category has a different barring factor and a different barring time, the network should determine an ACDC category of the application in consideration of significance of the application, the traffic pattern and the like.

Subsequently, the UE operates in RRC connected mode (S740). Although FIG. 7 shows an embodiment of making a transition to the RRC connected mode after the step S730, the UE may have been operating in the RRC connected mode since the step before the step S710. Namely, the configuration of the step S740 is just provided to describe that the operations of the steps S750, S760 and S770 are performed in the RRC connected mode.

Meanwhile, in the process for the UE to make transition to the TTC connected mode, the network (eNB) can inform the UE whether the traffic control method provided by the present invention is applied in the RRC connected mode. On the contrary, the UE can inform the eNB (or, another network node) whether the UE supports the traffic control method provided by the present invention in the RRC connected mode.

In the following, described is a case that a traffic control method is negotiated as applied in RRC connected mode in any manner. In viewpoint of the UE, the new data generated from the application received and cumulated in a PDCP buffer (S750). The UE identifies the application by confirming an ID of the application having generated the new data, an application name and the like, and then checks an ACDC category to which the identified application pertains to. A barring parameter indicated by the eNB differs per ACDC category, and the UE checks a barring parameter for new data transmission.

Meanwhile, a step of determining a presence or non-presence of a barring in continuation with the barring parameter checking step can be performed by one of an application unit, an ACDC category unit, and a PDCP entity unit, a logical channel unit. A detailed embodiment shall be described in FIG. 9.

Having confirmed the barring parameter, the UE determines whether data transmission of application/ACDC category/PDCP entity/logical channel is barred (S760). Such a step can be understood as performing a probability test for determining whether data transmission is approved. Namely, the UE determines whether to perform the data transmission in a manner of comparing a value selected on the basis of the information indicating a barring factor in the barring parameter with a random value.

In case of failing to pass the probability test, the UE does not send new data of the application (or, ACDC category, PDCP entity, logical channel) (S770). A time interval for not sending data may be determined according to the information indicating the barring time in the barring parameter of the ACDC configuration information. Namely, during the barring time, data transmission is not performed. If the barring time expires, the barring is released. The UE performs a new probability test for data generated after the expiration of the barring time and then determines whether to perform data transmission. On the contrary, if the probability test is passed, the UE sends new data of the application (or, ACDC category, PDCP entity, logical channel) (S770].

According to one embodiment, the aforementioned probability test can be performed only if an ongoing barring on an application (or, ACDC category, PDCP entity, logical channel) does not exist. So to speak, while data for a specific application/ACDC category/PDCP entity/logical channel is barred due to failing to pass the probability test (i.e., while a barring time does not expire), if new data is generated, the UE does not perform a new probability test until the barring time expires. Once the barring time expires, the UE can determine a presence or non-presence of the barring again by performing a new probability text on application/ACDC category/PDCP entity/logical channel. Yet, if data having a priority higher than that of the data currently barred due to failing to pass the probability test is generated in the course of performing the probability text, a new probability test for the data having the higher priority can be performed.

According to another embodiment, if the UE performs SR (scheduling request) or BSR (buffer status report) in the course of a barring in progress, a MAC entity of the UE performs SR/BSR without considering a barred application/ACDC category/PDCP entity/logical channel. So to speak, in the course of informing the eNB of a data capacity that will be sent by the MAC entity of the UE through the SR/BSR, the MAC entity informs the eNB of the data capacity except a barred data part.

This is to prevent assignment of unnecessary data capacity despite that data to be sent is barred. According to the above embodiment, as the barred data of specific application/ACDC category/PDCP entity/logical channel is not counted, BSR itself may not be triggered. Or, if the BSR is triggered for the reason of a different application or the like, the UE may perform the BSR by excluding a data part of a specific application/ACDC category/PDCP entity/logical channel. Meanwhile, a detailed process of the BSR performed embodiment may vary slightly per unit (application/ACDC category/PDCP entity/logical channel) of performing a barring, which shall be further described in FIG. 9.

With reference to FIG. 7, described is the embodiment for the UE to send application information to the eNB each time a new application is installed. On the other hand, the step S720 may be performed after generating data from a specific application instead of being performed according to each application installation. So to speak, although data generated from a specific application arrives at NAS/AS layer, if there is no ACDC related information on the corresponding application, the UE can then inform the eNB of application information. According to such an embodiment, as a step S750 is performed after the step S710, the steps S720 and S730 are sequentially performed.

FIG. 8 is described as follows. Unlike FIG. 7, FIG. 8 shows an embodiment that a network operates to play a leading role. The embodiments described in the aforementioned steps S710 to S740 of FIG. 7 are similarly applicable to FIG. 8 and their details shall be omitted.

In case of intending to block/stop/suspend data transmission from a specific application/ACDC category/PDCP entity, an eNB sends a logical channel barring indication message to a UE, thereby barring the data transmission from the specific application/ACDC category/PDCP entity (S850). Data from an application is mapped to a plurality of logical channels. If the data is mapped by bearer unit, it is mapped to a prescribed single logical channel. Hence, by barring the data transmission from a specific logical channel, the eNB enables the UE to stop data transmission of an application/ACDC category/PDCP entity related to the logical channel. In doing so, the logical channel barring indication message includes information indicating whether the data transmission of a prescribed application/ACDC category/PDCP entity/logical channel is barred or whether the data transmission of a prescribed application/ACDC category/PDCP entity/logical channel is allowed.

Subsequently, the UE stops the data transmission of the indicated logical channel (S860). The data transmission stopped logical channel may be excluded from a process for the UE to count data capacity for BSR. So to speak, the UE can only consider a logical channel of which data transmission is not stopped in a BSR process. According to a scheme of configuring a barring performed unit, the UE may stop the data transmission by an application/ACDC category/PDCP entity/logical channel unit, and the data excluded from the considered targets of BSR may also become an application/ACDC category/PDCP entity/logical channel unit.

Subsequently, in case of determining that it is unnecessary to further stop the data transmission, the eNB sends a logical channel release indication message to the UE, thereby indicating to resume the barred data transmission of the application/ACDC category/PDCP entity/logical channel (S870). The UE releases the barring according to the indication from the eNB and resumes the data transmission (S880).

Namely, in the embodiment shown in FIG. 8, the UE passively determines whether to transmit data of a specific application/ACDC category/PDCP entity/logical channel according to the indication from the eNB. The UE determines a presence or non-presence of a data barring according to the indication from the eNB without an additional process such as the probability test described in FIG. 7 and the like. The message sent to the UE by the eNB may include a MAC message, an RRC message, an NAS message or the like.

Meanwhile, in the embodiments described in FIG. 7 and FIG. 8, an eNB is described as setting a barring parameter that will be applied to a UE in RRC connected mode. On the other hand, an ACDC parameter applied in RRC idle mode may be utilized as a barring parameter of a proposed traffic control method. In particular, in the step S730 of FIG. 7 or the step S830 of FIG. 8, the eNB can instruct the UE to simply utilize an ACDC parameter, which is applied in RRC idle mode, in RRC connected mode as well. Hence, the UE can use a parameter, which is set to be used in RRC idle mode, in RRC connected mode intactly instead of setting a new barring parameter. On the other hand, the UE may utilize a value, which results from applying a prescribed offset value to an ACDC parameter set in RRC idle mode, as a barring parameter. In this case, the network may inform the UE of information of the offset through system information such as SIB (system information block). In case of utilizing the SIB, it is advantageous in that the same information can be delivered to a plurality of UEs at a time.

Figure 9:
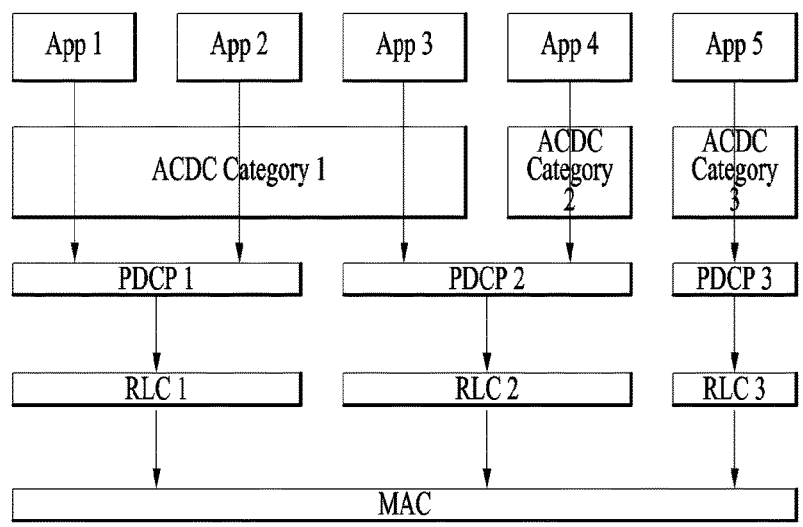
FIG. 9 is a diagram to describe an embodiment related to a proposed traffic control method.

FIG. 9 is a diagram to describe an embodiment related to a proposed traffic control method. In FIG. 9, described in detail is each case of implementing a barring performed level by application/ACDC category/PDCP entity/logical channel unit.

First of all, a case of performing the aforementioned traffic control method at an application level is described (i.e., a case of applying a barring per application). If a traffic control method is performed at an application level, a data transmission control per application is possible. Hence, it is able to control a presence or non-presence of data transmission by specifying an application, and a traffic control on a specific application has a greatest effect. Yet, since an eNB should inform the UE of whether to allow/prevent data transmission per application, it is disadvantageous in that a size of a message transceived in a configuration process increases. Moreover, if a name or ID of an application differs per an operating system of the UE, an additional signaling overhead exists.

Moreover, in case that a traffic control method is performed at an application level, when a quantity of a buffer is calculated in BSR, a size of data of a barred application is excluded. Namely, data corresponding to the barred application in the data buffered in a PDCP entity are excluded from the buffer quantity calculation process.

Subsequently, a case of performing a traffic control method at an ACDC category level is described. An ACDC category means a unit of groping one or more similar applications together. Hence, in comparison with a case applied at an application level, it is advantageous in that a signaling for a traffic control method and a size of a control message decrease. Particularly, although data of a plurality of ACDC categories are multiplexed with a single PDCP entity, a presence or non-presence of a barring can be determined per traffic. For example, in FIG. 9, App 3 corresponds to ACDC category 1 and App 4 corresponds to ACDC category 2. If ACDC category 1 is barred only, although App 3 and App 4 are connected to the same PDCP entity 2, a transmission of data of App 4 is performed only.

In case of performing a traffic control method per ACDC category, data of applications corresponding to an ACDC category barred in a BSR process are excluded from a buffer quantity calculation process.

A case of performing a traffic control method at a PDCP entity level is described. A PDCP entity needs not to know that data of prescribed applications are transmitted through itself. Hence, since the PDCP entity does not need to consider what kind of an OS is applied or what kind of an application is used, system implementation is advantageously simplified.

Since a control is performed per PDCP entity, even if data of different ACDC categories are transmitted on a single PDCP entity, all data transmissions of the corresponding PDCP entity can be barred. For example, if data of PDCP entity 2 is barred/allowed in FIG. 9, data transmission of App 3 and data transmission of App 4 are barred or allowed all.

In case of performing a traffic control method at a PDCP entity level, data corresponding to a barred PDCP entity in BSR are excluded from a buffer quantity calculation process.

Finally, described is a case of performing a traffic control method at a logical channel (or RLC) level. A case of a traffic control method applied at a logical channel level operates in a manner similar to that of a PDCP entity level. Yet, if data is not transmitted to an eNB from a UE, RLC provides a function of retransmitting data. Hence, if data transmission is barred per logical channel (or RLC), it is advantageous in barring retransmission data as well. Namely, if data transmission from a specific entity is barred in case of a different level, transmission of new data can be barred as well. Yet, it is unable to bar a retransmission of data performed in RLC. Namely, although transmission from a PDCP entity is barred, data already delivered to an RLC entity keeps being transmitted. Yet, if a transmission is controlled at a logical channel (or RLC) level, it is advantageous in that retransmission data can be barred as well according to a configuration.

In case of performing a traffic control method at a logical channel level (or RLC level), data corresponding to a barred logical channel (or RLC entity) in BSR are excluded from a buffer quantity calculation process. Additionally, data buffered in a PDCP entity linked to the barred logical channel (or RLC entity) are excluded from the buffer quantity calculation process.

In case of performing a traffic control method at a logical channel level (or RLC level), information indicating that each data is generated from a prescribed application, information indicating that each data is related to a prescribed ACDC category, or information indicating that each data is related to a prescribed PDCP entity can be additionally delivered when data is delivered to a lower layer from upper layers (e.g., application level, PDCP entity, etc.).

According to one embodiment, in order to mitigate buffer quantity calculation complexity of BSR, a buffer quantity calculation process in an RLC entity may be omitted. Namely, the RLC entity may not exclude a buffer quantity for data of a barred application, an ACDC category, or a PDCP entity discriminatively.

4. Device Configurations

Figure 10:
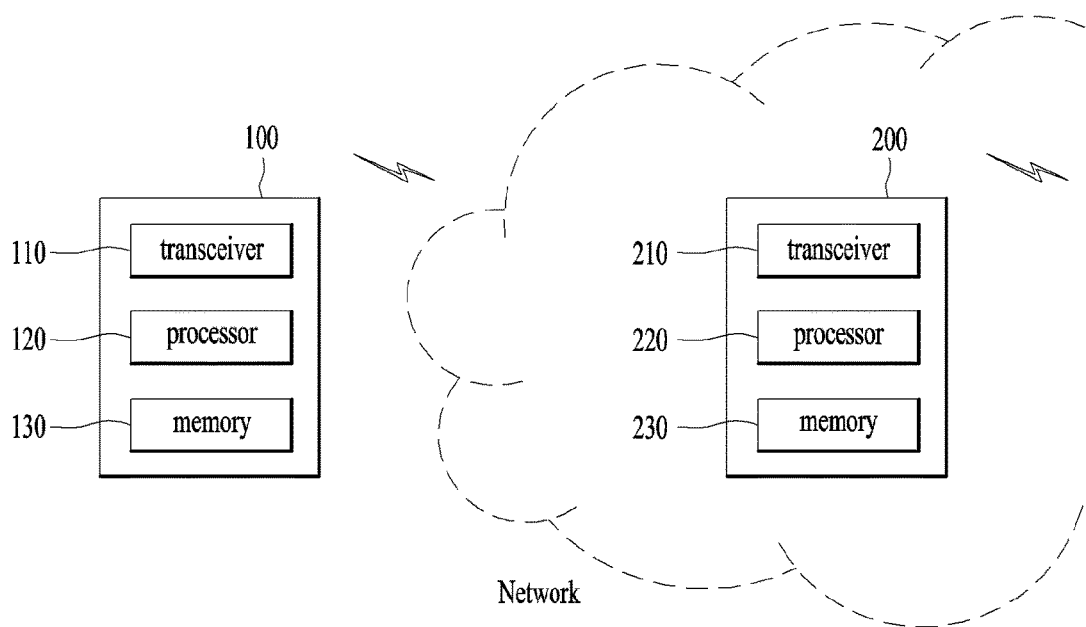
FIG. 10 is a diagram showing a configuration of a node device according to a proposed embodiment.

FIG. 10 is a diagram illustrating configurations of node devices according to a proposed embodiment.

A user equipment (UE) 100 may include a transceiver 110, a processor 120, and a memory 130. The transceiver 110 may be configured to transmit and receive various signals, data, and information to/from an external device. Alternatively, the transceiver 110 may be implemented with a combination of a transmitter and a receiver. The UE 100 may be connected to the external device by wire and/or wirelessly. The processor 120 may be configured to control overall operations of the UE 100 and process information to be transmitted and received between the UE 100 and the external device. Moreover, the processor 120 may be configured to perform the UE operation proposed in the present invention. The memory 130, which may be replaced with an element such as a buffer (not shown in the drawing), may store the processed information for a predetermined time.

Referring to FIG. 10, a network node 200 according to the present invention may include a transceiver 210, a processor 220, and a memory 230. The transceiver 210 may be configured to transmit and receive various signals, data, and information to/from an external device. The network node 200 may be connected to the external device by wire and/or wirelessly. The processor 220 may be configured to control overall operations of the network node 200 and process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configurations of the UE 100 and the network node 200 may be implemented such that the aforementioned various embodiments of the present invention can be independently applied or two or more embodiments can be simultaneously applied. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

INDUSTRIAL APPLICABILITY

The aforementioned traffic control method is applicable to various wireless communication systems including an IEEE 802.16x system and an IEEE 802.11x system as well as to a 3GPP system. Moreover, a proposed method is applicable to an mmWave communication system that uses an ultra-high frequency band.

What is claimed is:

1. A method for controlling traffic of a user equipment (UE) supporting application specific congestion control for data communication (ACDC), the method comprising:
transmitting a first message including information of an installed application to a base station (BS);
receiving a second message including information of a barring parameter for the application;
determining whether to bar a transmission of data generated from the application based on the barring parameter for the application in the course of operation in a radio resource control (RRC) connected mode; and
selectively transmitting the data, and performing a buffer status report (BSR), to the BS based on the determined result,
wherein the BSR is performed, excluding a quantity of barred data in a data quantity calculation process for the BSR, based on the determined result.

2. The method of claim 1, wherein the transmission of the data is barred at one of an application level, an ACDC category level, a packet data convergence protocol (PDCP) entity level, a logical channel level, and a radio link control (RLC) level.

3. The method of claim 1, wherein the first message includes information corresponding to at least one of an ID of the installed application, a name of the installed application, a traffic transmission period of the installed application, an average packet size of the installed application, a protocol used for a data transmission of the installed application, and a presence or non-presence of an emergency relation of the application.

4. The method of claim 1, wherein the barring parameter includes at least one of a barring factor for determining a barring rate of the application and a barring time for determining a time interval for barring the application.

5. The method of claim 4, wherein the step of determining whether to bar the transmission comprises determining whether to bar the transmission of the data according to a result from performing a probability test based on the barring factor.

6. The method of claim 1, wherein the step of determining whether to bar the transmission is performed only when an ongoing barring does not exist, and
wherein when the ongoing barring exists, the data is not transmitted to the BS.

7. The method of claim 1, wherein when the second message indicates to utilize an ACDC parameter in RRC idle mode, instead of the information of the barring parameter, the step of determining whether to bar the transmission is performed based on the ACDC parameter in the RRC idle mode.

8. The method of claim 1, wherein the second message further includes information on an ACDC category associated with the application.

9. The method of claim 1, wherein each of the first message and the second message comprises an RRC message or a non-access stratum (NAS) message.

10. A user equipment (UE) supporting application specific congestion control for data communication (ACDC), the UE comprising:
    a transmitter;
    a receiver; and
    a processor, operably coupled to the transmitter and the receiver, wherein the processor is configured to:
    control the transmitter to transmit a first message including information of an installed application to a base station (BS);
    control the receiver to receive a second message including information of a barring parameter for the application;
    determine whether to bar a transmission of data generated from the application based on the barring parameter for the application in the course of operation in a radio resource control (RRC) connected mode; and
    control the transmitter to selectively transmit the data, and perform a buffer status report (BSR), to the BS based on the determined result,
    wherein the BSR is performed, excluding a quantity of barred data in a data quantity calculation process for the BSR, based on the determined result.

11. The UE of claim 10, wherein the transmission of the data is barred at one of an application level, an ACDC category level, a packet data convergence protocol (PDCP) entity level, a logical channel level, and a radio link control (RLC) level.

12. The UE of claim 10, wherein the first message includes information corresponding to at least one of an ID of the installed application, a name of the installed application, a traffic transmission period of the installed application, an average packet size of the installed application, a protocol used for a data transmission of the installed application, and a presence or non-presence of an emergency relation of the application.

13. The UE of claim 10, wherein the barring parameter includes at least one of a barring factor for determining a barring rate of the application and a barring time for determining a time interval for barring the application.

14. The UE of claim 13, wherein the processor is further configured to determine whether to bar the transmission of the data according to a result from performing a probability test based on the barring factor.

15. The UE of claim 10, wherein the processor is further configured to determine whether to bar the transmission only when an ongoing barring does not exist, and
    wherein when the ongoing barring exists, the data is not transmitted to the BS.

16. The UE of claim 10, wherein when the second message indicates to utilize an ACDC parameter in RRC idle mode, instead of the information of the barring parameter, the processor is further configured to determine whether to bar the transmission based on the ACDC parameter in the RRC idle mode.

17. The UE of claim 10, wherein the second message further includes information on an ACDC category associated with the application.

18. The UE of claim 10, wherein each of the first message and the second message comprises an RRC message or a non-access stratum (NAS) message.

* * * * *